US010575135B2

(12) United States Patent
Tanabe et al.

(10) Patent No.: US 10,575,135 B2
(45) Date of Patent: Feb. 25, 2020

(54) PORTABLE ELECTRONIC DEVICE, METHOD OF CONTROLLING PORTABLE ELECTRONIC DEVICE, AND NON-TRANSITORY COMPUTER-READABLE MEDIUM

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Kawasaki (JP); Tetsushi Wakasa, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 16/197,589

(22) Filed: Nov. 21, 2018

(65) Prior Publication Data
US 2019/0098455 A1 Mar. 28, 2019

Related U.S. Application Data

(63) Continuation of application No. PCT/JP2017/019142, filed on May 23, 2017.

(30) Foreign Application Priority Data

May 24, 2016 (JP) ................... 2016-103686

(51) Int. Cl.
*H04W 24/00* (2009.01)
*H04W 4/029* (2018.01)
*G01C 21/26* (2006.01)
*G01S 1/68* (2006.01)
*G09B 29/10* (2006.01)
(Continued)

(52) U.S. Cl.
CPC ............ *H04W 4/029* (2018.02); *G01C 21/20* (2013.01); *G01C 21/26* (2013.01); *G01S 1/68* (2013.01); *G01S 5/0027* (2013.01); *G08G 1/005* (2013.01); *G09B 29/10* (2013.01); *H04M 1/00* (2013.01); *H04W 4/021* (2013.01); *H04W 4/027* (2013.01)

(58) Field of Classification Search
CPC ....... H04W 4/029; G01C 21/20; G01C 21/26; G01C 1/68
See application file for complete search history.

(56) References Cited

U.S. PATENT DOCUMENTS 7,840,326 B1 * 11/2010 Yamada ................ B60Q 1/085
701/472
8,058,987 B1 * 11/2011 Battista ................ G06Q 10/047
340/539.13

(Continued)

FOREIGN PATENT DOCUMENTS

EP 1666843 A1 6/2006
JP H11-160085 A 6/1999
(Continued)

*Primary Examiner* — Justin Y Lee
(74) *Attorney, Agent, or Firm* — Studebaker & Brackett PC

(57) ABSTRACT

Provided is a portable electronic device including a transceiver configured to acquire information from a roadside device, a storage, and a controller configured to acquire position information of the roadside device based on the information acquired by transceiver, and to cause the storage to store the acquired position information as position information of the portable electronic device at a time of acquiring the information.

14 Claims, 6 Drawing Sheets

(51) Int. Cl.

| | |
|---|---|
| *G08G 1/005* | (2006.01) |
| *H04M 1/00* | (2006.01) |
| *G01C 21/20* | (2006.01) |
| *G01S 5/00* | (2006.01) |
| *H04W 4/021* | (2018.01) |
| *H04W 4/02* | (2018.01) |

(56) References Cited

U.S. PATENT DOCUMENTS

| | | |
|---|---|---|
| 2014/0335897 A1 | 11/2014 | Clem et al. |
| 2015/0369618 A1 | 12/2015 | Barnard et al. |
| 2018/0210088 A1* | 7/2018 | Okada .................... G01S 19/06 |

FOREIGN PATENT DOCUMENTS

| | | |
|---|---|---|
| JP | 2000-180199 A | 6/2000 |
| JP | 2001-099672 A | 4/2001 |
| JP | 2003-244739 A | 8/2003 |
| JP | 2008-113184 A | 5/2008 |
| JP | 2010-009629 A | 1/2010 |
| JP | 2012-015714 A | 1/2012 |
| JP | 2015-076729 A | 4/2015 |
| JP | 2015-137979 A | 7/2015 |
| WO | 2005/022086 A1 | 3/2005 |

\* cited by examiner

# PORTABLE ELECTRONIC DEVICE, METHOD OF CONTROLLING PORTABLE ELECTRONIC DEVICE, AND NON-TRANSITORY COMPUTER-READABLE MEDIUM

CROSS-REFERENCE TO RELATED APPLICATION

The present application is a continuation based on PCT Application No. PCT/JP2017/019142 filed on May 23, 2017, which claims the benefit of Japanese Application No. 2016-103686, filed on May 24, 2016. PCT Application No. PCT/JP2017/019142 is entitled "PORTABLE ELECTRONIC DEVICE, METHOD FOR CONTROLLING PORTABLE ELECTRONIC DEVICE, AND CONTROL PROGRAM FOR PORTABLE ELECTRONIC DEVICE", and Japanese Application No. 2016-103686 is entitled "PORTABLE ELECTRONIC DEVICE, METHOD FOR CONTROLLING PORTABLE ELECTRONIC DEVICE, AND CONTROL PROGRAM FOR PORTABLE ELECTRONIC DEVICE", the content of which are incorporated by reference herein in their entirety.

FIELD

The present disclosure relates to a portable electronic device, a method of controlling the portable electronic device, and a non-transitory computer-readable medium.

BACKGROUND

There is known a technique for confirming the location of an elderly person or the like by using a Global Positioning System (GPS) receiver included in a portable electronic device.

SUMMARY

A portable electronic device, a method of controlling the portable electronic device, and a non-transitory storage medium are disclosed. In one embodiment, a portable electronic device including a transceiver configured to acquire information from a roadside device, a storage, and at least one processor configured to acquire position information of the roadside device based on the information acquired by the transceiver, and to cause the storage to store the acquired position information of the road side device as position information of the portable electronic device at a time of acquiring the information.

In another embodiment, a control method of a portable electronic device is a method of controlling a portable electronic device including a storage, the method including the steps of acquiring information from a roadside device, acquiring position information of the roadside device based on the acquired information, and storing the acquired position information of the road side device as position information of the portable electronic device at a time of acquiring the information.

In yet another embodiment, a non-transitory computer-readable medium stores a control program in a portable electronic device to execute a process of receiving information from a roadside device, determining position information of the roadside device based on the received information, and causing a storage of the portable electronic device to store the determined position information of the road side device as position information of the portable electronic device at a time of receiving the information.

DETAILED DESCRIPTION

Embodiments will be described in detail with reference to the drawings. In the following, smartphones will be described as examples of portable electronic devices.

Figure 1:
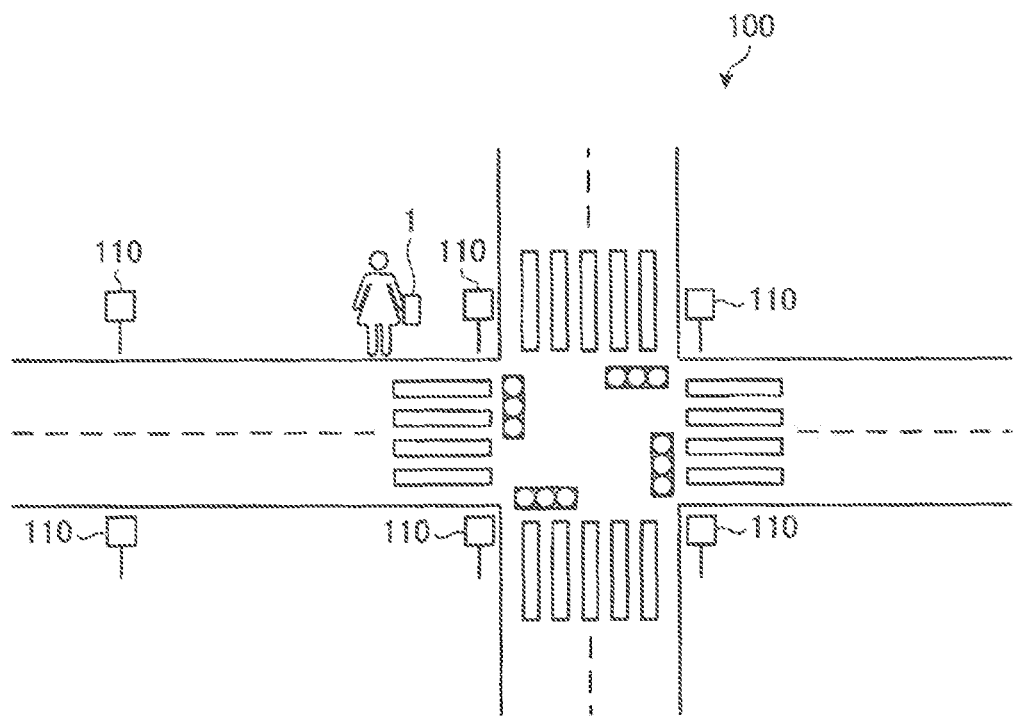
FIG. 1 illustrates a schematic diagram showing a schematic configuration of a control system including a smartphone according to an embodiment.
Figure 2:
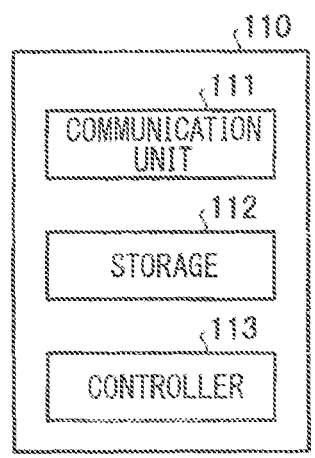
FIG. 2 illustrates a block diagram of a roadside device included in the control system.

With reference to FIG. 1, the overall configuration of a control system 100 including a smartphone 1 as a portable electronic device according to an embodiment will be described. The control system 100 includes a roadside device 110 and a smartphone 1. Although FIG. 1 shows six roadside devices 110 and one smartphone 1, the control system 100 may include one or more roadside devices 110 and one or more smartphones 1, and the numbers of the devices and the smartphones are not limited.

In FIG. 1, two roads intersect at an intersection having a traffic signal. A crosswalk is located at the intersection.

With reference to FIG. 1, the overall configuration of the roadside device 100 will be described. The roadside device 110 wirelessly outputs identification information of the self-device. The identification information of the self-device is information for identifying each roadside device 110, for example, information indicating an identification number. The roadside device 110 may wirelessly output road information including, for example, signal information, congestion information, and regulation information, along with the identification information of the self-device. The roadside device 110 includes a communication unit 111, a storage 112, and a controller 113.

The communication unit 111 communicates by radio. The communication unit 111 supports a wireless communication standard including Worldwide Interoperability for Microwave Access (WiMAX), IEEE 802.11 (including a, b, n, p), Bluetooth (registered trademark), Infrared Data Association (IrDA), Near Field Communication (NFC), and so forth. The communication unit 111 may also support a cellular phone communication standard such as 2G (generation), 3G (generation), and 4G (generation) including Long Term Evolution (LTE), Wideband Code Division Multiple Access (W-CDMA), CDMA2000, Personal Digital Cellular (PDC), Global System for Mobile Communications (GSM) (registered trademark), Personal Handy-phone System (PHS), and so forth. The communication unit 111 supports one or more of the communication standards described above. The communication unit 111 may support wired communication such as Ethernet (registered trademark), fiber channel, and so forth, for example.

The communication unit 111 communicates with other roadside devices 110 and traffic lights. The communication unit 111 communicates with a communication device within a predetermined distance by short-range wireless communication, for example, a communication device mounted on a vehicle and the smartphone 1, and transmits and receives data. In one embodiment, the communication unit 111 communicates with the smartphone 1, and transmits and receives data including the identification information of the roadside device 110 and the road information.

The storage 112 stores programs and data. The storage 112 is also used as a work area for temporarily storing the processing result of the controller 113. The storage 112 may include any non-transitory storage medium such as a semiconductor storage medium and a magnetic storage medium. The non-transitory storage medium includes, for example, an optical disk such as CD (registered trademark), DVD (registered trademark), Blu-Ray (registered trademark), a magneto optical disk, a magnetic storage medium, a memory card, a solid state storage medium, but it is not limited thereto. The storage 112 may include a plurality of types of storage media. The storage 112 my include a combination of a portable storage medium such as a memory card, an optical disk, or a magneto-optical disk and a reading device of a storage medium. The storage 112 may include a storage device used as a temporary storage area such as a Random Access Memory (RAM).

The program to be stored in the storage 112 includes a program that establishes communication between the communication device within a predetermined distance from the roadside device 110 and the communication unit 111 and controls transmission and reception of data. The data to be stored in the storage 112 includes, for example, data to be transmitted to another communication device such as identification information of the roadside device 110.

The controller 113 includes an arithmetic processing unit. The arithmetic processing unit includes, but not limited to, a Central Processing Unit (CPU), a System-on-a-Chip (SoC), a Micro Control Unit (MCU), and a Field-Programmable Gate Array (FPGA). The controller 113 integrally controls the operation of the roadside device 110 to realize various functions.

Specifically, the controller 113 executes an instruction included in the program stored in the storage 112 while referring to the data stored in the storage 112 as necessary. And, the controller 113 controls the function unit in accordance with the data and the instruction, thereby realizing various functions. The controller 113 can also be said to be a control circuit. The controller 113 includes at least one processor to provide control and processing capabilities to execute various functions, as described in further detail below.

According to embodiments, the at least one processor may be implemented as a single integrated circuit (IC) or as a plurality of communicably coupled integrated circuits IC and/or discrete circuits. The at least one processor can be implemented in accordance with various known techniques.

In one embodiment, the processor includes one or more circuits or units configured to perform one or more data calculation procedures or processes, for example, by executing instructions stored in an associated memory. In other embodiments, the processor may be firmware (for example, a discreet logic component) configured to perform one or more data calculation procedures or processes.

According to embodiments, the processor may be one or more of a processor, a controller, a microprocessor, a microcontroller, an Application-Specific Integrated Circuit (ASIC), a digital signal processor, a programmable logic device, a field programmable gate array, or any combination of the devices or configurations or combinations of other known devices and configurations may be included to perform the functions described below.

Figure 4:
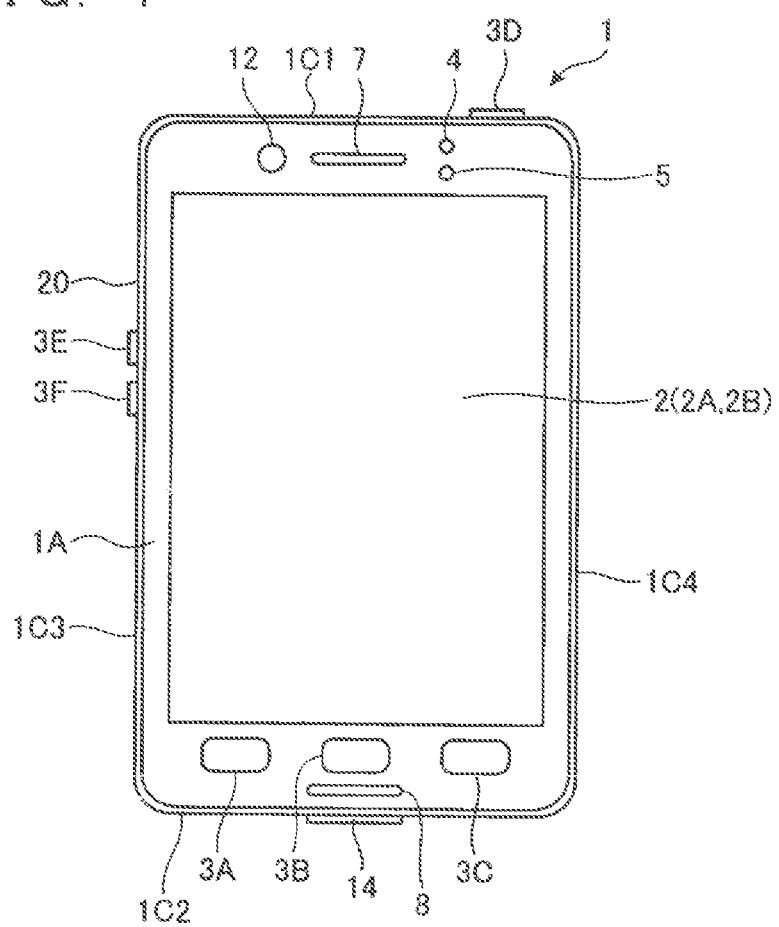
FIG. 4 illustrates a front view of the smartphone according to an embodiment.
Figure 5:
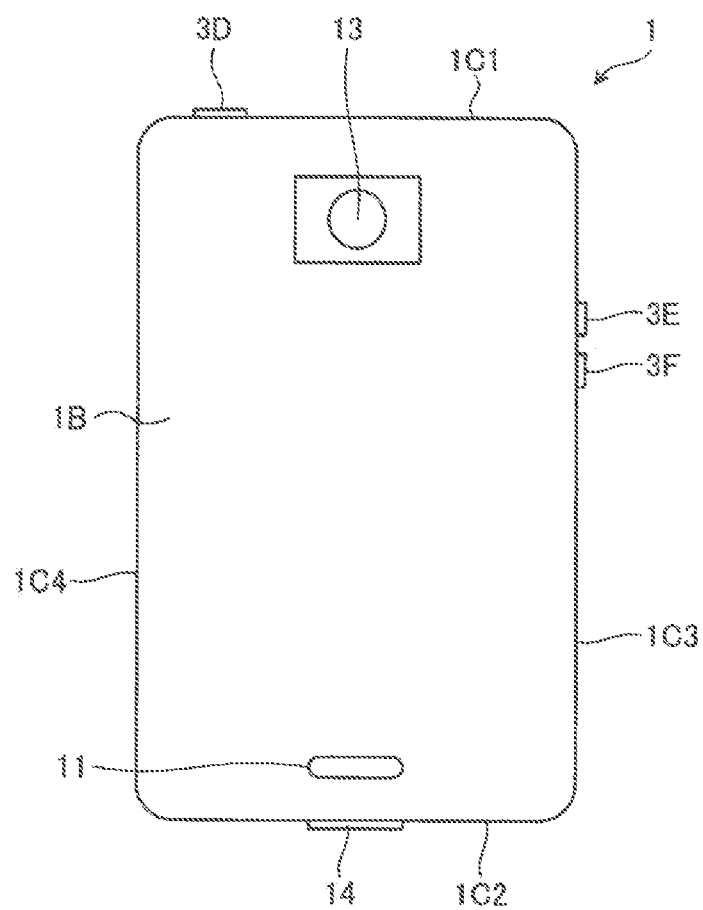
FIG. 5 illustrates a rear view of the smartphone according to an embodiment.

The overall configuration of the smartphone 1 according to an embodiment will be described with reference to FIGS. 3 to 5. The smartphone 1 has a housing 20. The housing 20 has a front face 1A, a back face 1B, and side faces 1C1 to 1C4. The front face 1A represents the front face of the housing 20. The back face 1B represents the back face of the housing 20. The side faces 1C1 to 1C4 are side faces connecting the front face 1A and the back face 1B. In the following, the side faces 1C1 to 1C4 may be collectively referred to as side face 1C without indicating any particular side face. The configuration of the smartphone 1 shown in FIGS. 3 to 5 is an example, and may be appropriately changed within a scope not to impair the gist of the present disclosure.

The smartphone 1 has a touch screen display (display) 2, buttons 3A to 3C, an illuminance sensor 4, a proximity sensor 5, a receiver 7, a microphone 8, and a camera 12 in the front face 1A. The smartphone 1 has a speaker 11 and a camera 13 in the back face 1B. The smartphone 1 has buttons 3D to 3F and a connector 14 in the side face 1C. In the following, the buttons 3A to 3F may be collectively referred to as button 3 without indicating any particular button.

Figure 3:
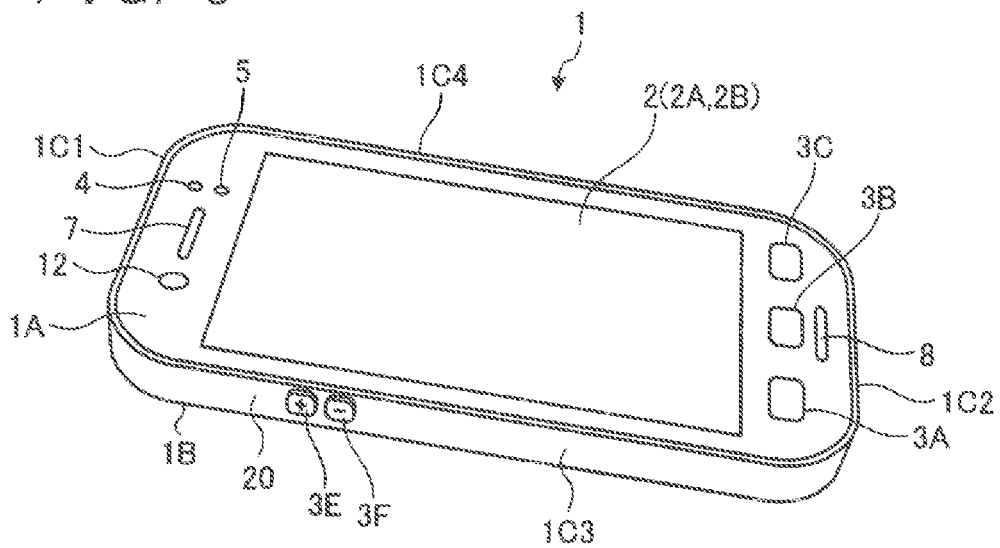
FIG. 3 illustrates a perspective view of the smartphone according to an embodiment.

The touch screen display 2 has a display 2A and a touch screen 2B In an example of FIG. 3, the display 2A and the touch screen 2B each have a substantially rectangular shape, however, the shapes of the display 2A and the touch screen 2B are not limited thereto.

Each of the display 2A and the touch screen 2B may have any shape such as a square shape or a circular shape. In the example of FIG. 3, although the display 2A and the touch screen 2B overlap each other, the positions of the display 2A and the touch screen 2B are not limited thereto. For example, the display 2A and the touch screen 2B may be positioned side by side or separated from each other. Although the example of FIG. 3, the long side of the display 2A is along the long side of the touch screen 2B and the short side of the display 2A is along the short side of the touch screen 2B, the overlapping manner of the display 2A and the touch screen 2B is not limited thereto. When the display 2A and the touch screen 2B overlap each other, for example, one or a plurality of sides of the display 2A may not be along either side of the touch screen 2B.

The display 2A includes a display device such as a Liquid Crystal Display (LCD), an Organic Electro-Luminescence Display (OELD), or an Inorganic Electro-Luminescence Display (IELD). The display 2A displays objects such as characters, images, symbols, graphics, and the like.

The touch screen 2B detects contact of an operator, such as a finger, a pen, a stylus pen, or the like, with respect to the touch screen 2B. The touch screen 2B can detect a position where an operator, such as a plurality of fingers, a pen, a stylus pen, or the like touches the touch screen 2B. The detection method of the touch screen 2B may include an arbitrary method such as an electrostatic capacitance method, a resistive film method, a surface acoustic wave method (or an ultrasonic method), an infrared method, an electromagnetic induction method, and a load detection method. In the following description, for simplicity of explanation, it is assumed that a user touches the touch screen 2B using a finger in order to operate the smartphone 1.

The smartphone 1 determines operation (gesture) to be performed on the touch screen 2B based on at least one of a contact detected by the touch screen 2B, a position where a contact is detected, a change in a position where a contact is detected, a time interval in which a contact is detected, and a number of times a contact is detected. Operations performed on the touch screen 2B include, but not limited to, touch, long touch, release, swipe, tap, double tap, long tap, drag, flick, pinch in, and pinch out.

Figure 6:
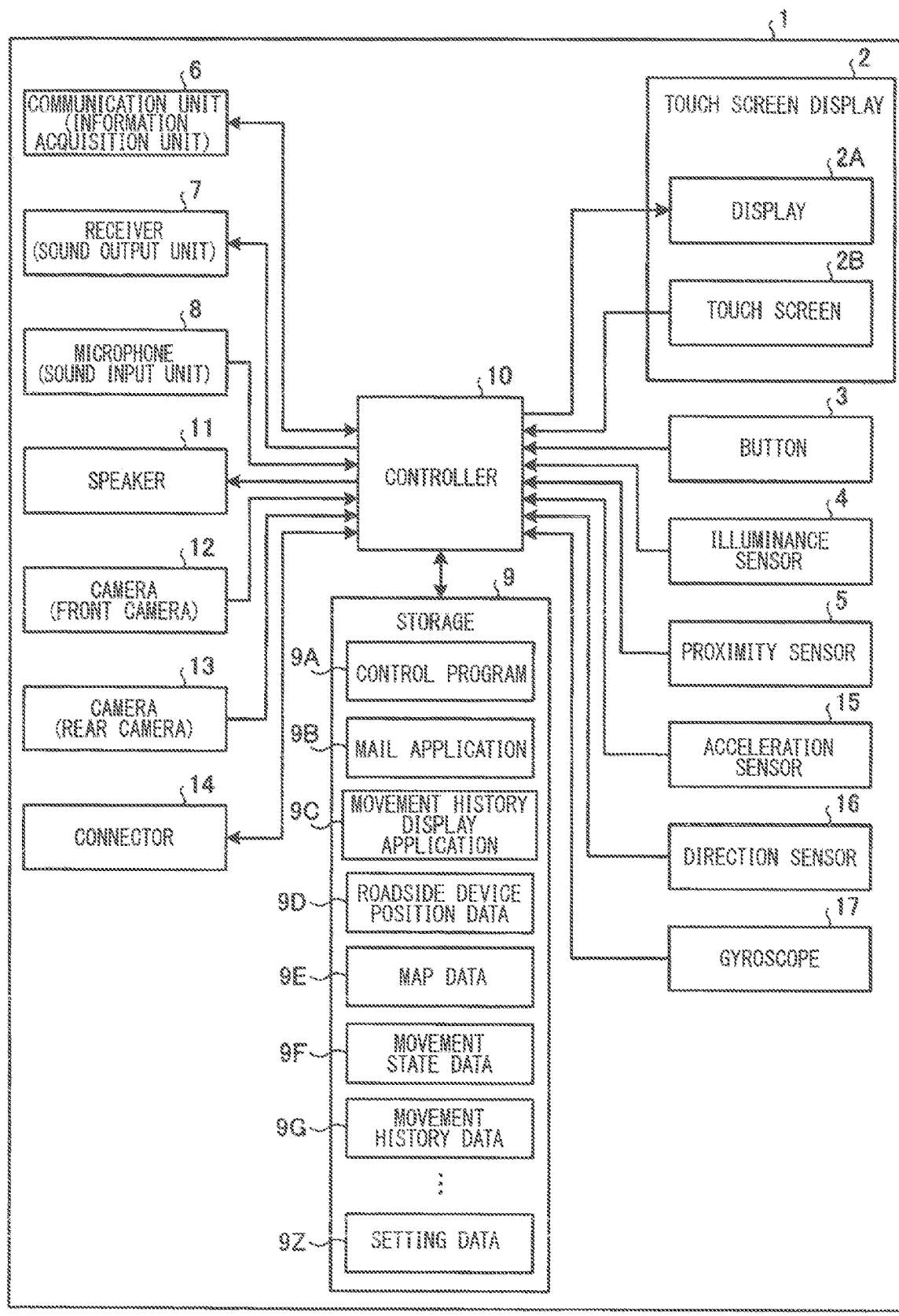
FIG. 6 illustrates a block diagram of the smartphone according to an embodiment.

The functional configuration of the smartphone 1 according to an embodiment will be described with reference to FIGS. 6. The configuration of the smartphone 1 shown in FIG. 6 is an example, and may be appropriately changed within a scope not to impair the gist of the present disclosure.

The smartphone 1 includes a touch screen display 2, a button 3, an illuminance sensor 4, a proximity sensor 5, a communication unit (information acquisition unit, transmitter) 6, a receiver 7, a microphone 8, a storage (storage) 9, a controller 10, a speaker 11, a camera 12 and a camera 13, a connector 14, an acceleration sensor 15, a direction sensor 16, and a gyroscope 17.

The touch screen display 2 has, as described above, a display 2A and a touch screen 2B The display 2A displays objects such as characters, images, symbols, graphics, and the like. The touch screen 2B detects contact of an operator. The touch screen 2B outputs information on the detected contact to the controller 10.

The button 3 is operated by a user. The button. 3 includes buttons 3A to 3F. The controller 10 can detect an operation on the button 3 by cooperating with the button 3. Operations on button 3 include, but not limited to, click, double click, triple click, push, and multi push, for example.

The buttons 3A to 3C represent, for example, a home button, a back button or a menu button. The button 3D represents, for example, a power on-off button of the smartphone L. The button 3D may also serve as a sleep/sleep-release button. For example, the buttons 3E and 3F are configured as volume buttons.

The illuminance sensor 4 can detect the illuminance of the ambient light of the smartphone 1. Illuminance indicates light intensity, brightness, or luminance. The illuminance sensor 4 is used, for example, for adjusting the luminance of the display 2A. The proximity sensor 5 can detect the presence of a neighboring object in a noncontact manner. The proximity sensor 5 detects the presence of an object based on a change in a magnetic field, a change in a feedback time of a reflected wave of an ultrasonic wave, or the like. The proximity sensor 5 detects, for example, that the touch screen display 2 has been being approached toward the face. The illuminance sensor 4 and the proximity sensor 5 may be configured as one sensor. The illuminance sensor 4 may be used as a proximity sensor.

The communication unit 6 can communicate wirelessly. In one embodiment, the communication unit 6 has a function of at least a short-range wireless communication. The communication method to be supported by the communication unit 6 is a wireless communication standard. The communication unit 6 supports communication standards of cellular phones such as 2G, 3G, 4G, and 5G. The cellular phone communication standards include, for example, LTE, W-CDMA, CDMA 2000, PDC, GSM (registered trademark) and PHS. The communication unit 6 may support wireless communication standards including WiMAX, IEEE 802.11, Bluetooth (registered trademark), IrDA, NFC, and the like, for example. The communication unit 6 may support one or more of the communication standards described above.

The communication unit 6 may support wired communication. The wired communication includes, for example, Ethernet (registered trademark), fiber channel, and so forth.

In one embodiment, the communication unit 6 supports a communication standard for enabling communication with the roadside device 110 arranged by the road. For example, the smartphone 1 acquires information on the roadside device 110 by communicating with the roadside device 110 via the communication unit 6. In one embodiment, the communication unit 6 may support a communication standard for enabling communication with a communication device mounted on a vehicle. For example, the smartphone 1 acquires information on the vehicle by communicating with the vehicle via the communication unit 6.

The receiver 7 and the speaker 11 are configured as sound output units. The receiver 7 and the speaker 11 can output a sound signal transmitted from the controller 10 as a sound. The receiver 7 is used, for example, to output the sound of the opposite party during a call. The speaker 11 is used, for example, to output the sound of the ringtone and a piece of music. Either the receiver 7 or the speaker 11 may also serve as the function of the other.

The microphone 8 is configured as a sound input unit. The microphone 8 can convert the voice or the like of the user into a sound signal and transmit it to the controller 10.

The acceleration sensor 15 can detect information indicating the direction and magnitude of the acceleration acting on the smartphone 1. The direction sensor 16 can detect information indicating the direction of the terrestrial magnetism. The gyroscope 17 can detect information on the angle and angular velocity of the smartphone 1. The detection results of the acceleration sensor 15, the direction sensor 16 and the gyroscope 17 are used in combination, for example, in order to detect changes in the position and the posture of the smartphone 1.

In an example shown in FIG. 6, the smartphone 1 has three types of sensors for detecting the position and the posture, however, the smartphone 1 may not include some sensors among the three sensors. Alternatively, the smartphone 1 may include other types of sensors for detecting at least one of the position and the posture.

Controlling the other components of the smartphone 1 enables the controller 10 to integrally manage the operation of the smartphone 1. The controller 10 can also be said to be a control circuit. The controller 10 includes at least one processor to provide control and processing capabilities to execute various functions, as described in further detail below.

According to embodiments, the at least one processor may be implemented as a single integrated circuit (IC) or as a plurality of communicably coupled integrated circuits IC and/or discrete circuits. The at least one processor can be implemented in accordance with various known techniques.

In one embodiment, the processor includes one or more circuits or units configured to perform one or more data calculation procedures or processes, for example, by executing instructions stored in an associated memory. In other embodiments, the processor may be firmware (for example, a discreet logic component) configured to perform one or more data calculation procedures or processes.

According to embodiments, the processor may be one or more of a processor, a controller, a microprocessor, a microcontroller, an Application-Specific Integrated Circuit (ASIC), a digital signal processor, a programmable logic device, a field programmable gate array, or any combination of the devices or configurations or combinations of other known devices and configurations may be included to perform the functions described below.

The storage 9 stores programs and data. The storage 9 is also used as a work area for temporarily storing the processing result of the controller 10. The storage 9 may include any non-transitory storage medium such as a semiconductor storage medium and a magnetic storage medium. The storage 9 may include a plurality of types of storage media. The storage 9 may include a combination of a portable storage medium such as a memory card, an optical disk, or a magneto-optical disk and a reading device of a storage medium. The storage 9 may include a storage device used as a temporary storage area such as a RAM.

Part or all of the programs and data stored in the storage 9 may be downloaded from another device by communication by the communication unit 6. Part or all of the programs and data stored in the storage 9 may be stored in a non-transitory storage medium readable by a reading device included in the storage 9. Part or all of the programs and data stored in the storage 9 may be stored in a non-transitory storage medium readable by a reading device connected to the connector (not illustrated).

The program to be stored in the storage 9 includes an application program (hereinafter referred to as an application) executed in the foreground or the background and a control program for supporting the operation of the application. The application causes the controller 10 to execute, for example, a process of displaying a screen on the display 2A and a process corresponding to a gesture detected via the touch screen 2B. The control program includes, for example, an Operating System (OS).

The storage 9 stores, for example, a control program 9A, a mail application 9B, a movement history display application 9C, roadside device position data 9D, map data 9E, movement state data 9F, movement history data 9G, and setting data 9Z.

The mail application 9B provides an e-mail function for creating, sending, receiving, displaying, etc. the e-mail.

The movement history display application 9C provides a function of displaying a movement history (movement log) of a user carrying the smartphone 1 (hereinafter simply referred to as a user). By executing the movement history display application 9C, the controller 10 executes the operation described below.

The controller 10 can cause the touch screen display 2 to display the movement history of the user in chronological order. Alternatively, the controller 10 may cause the touch screen display 2 to display the movement history of the user on the map. The controller 10 may also cause the touch screen display 2 to display, for example, a line connecting position information of the smartphone 1 along a time series on the map as a movement route. Alternatively, if the position information of the smartphone 1 satisfies the predetermined condition, the controller 10 may cause the touch screen display 2 to display the position information of the smartphone 1 that satisfies the predetermined condition in a manner different from the other position information of the smartphone 1. Here, for example, the controller 10 may determine that the predetermined condition is satisfied if the position information of the smartphone 1 is out of a predetermined range, so that the user is determined to be in an unusual place. In this case, as the predetermined range, a range in which the user usually acts is adopted. Alternatively, the controller 10 may determine that the predetermined condition is satisfied, for example, if the position information is within a predetermined range, so that the user is passing through a road with a high traffic volume or a high degree of danger. In this ease, as the predetermined range, a road with a large traffic volume or a road with many accidents is adoptable.

In the roadside device position data 9D, the identification information of the roadside device 110 and the position information are previously stored in association with each other. More specifically, for each identification information of the roadside device 110, the roadside device position data 9D stores the installation position of the roadside device 110 as position information indicated by latitude and longitude.

The map data 9E stores map information.

The movement state data 9F includes information used for estimating the movement state of the user. The movement state data 9F stores a correspondence relationship between the detection result of the sensor and the movement state detected in advance by a test, a simulation, and so forth. In one embodiment, the movement state data 9F stores reference data for determining whether or not the user is walking.

The movement history data 9G stores the position information of the smartphone 1 at the time of acquiring information from the roadside device 110 and the movement state of the user along with the time (including date) when the information is acquired from the roadside device 110.

The setting data 9Z includes information on various settings related to the operation of the smartphone 1. The setting data 97 stores the usual action range of the user as a range indicated by, for example, latitude and longitude. The setting data 9Z stores transmission destination information of a transmission destination of the user's position information, in one embodiment, the transmission destination information includes, for example, a mail address of an offspring of an elderly person when the user of the smartphone 1 is an elderly person, and a mail address of a parent of a small child when the user of the smartphone 1 is a small child.

The control program 9A provides functions related to various controls for operating the smartphone 1. The control program 9A provides a function of realizing a call by, for example, controlling the communication unit 6, the receiver 7, the microphone 8, and so forth. The function provided by the control program 9A includes a function of controlling information to be displayed on the display 2A. The functions provided by the control program 9A include a function of performing various controls such as changing information displayed on the display 2A according to an operation detected via the touch screen 2B. The functions provided by the control program 9A may be used in combination with functions provided by other programs such as the mail application 9B.

The controller 10 configured to execute the control program 9A can perform the following operations. The controller 10 determines the movement state of the user. The movement state includes a stopped state in which the user is stopped, a walking state in which the user is walking, a running state in which the user is running, and a riding state in which the user is riding in the automobile or the train. The controller 10, measures vibration and movement acting on the smartphone 1 based on the direction and magnitude of the acceleration acquired from the acceleration sensor 15. The controller 10 refers to the movement state data 9F and determines the movement state from the measurement results of vibration and movement. As a substitute for or as a supplement for the acceleration sensor 15, the controller 10 may determine the movement state by using at least one of the direction sensor 16, the gyroscope 17, the microphone 8, the camera 12, and the camera 13.

By executing the control program 9A, the controller 10 acquires the position information of the roadside device 110 from the roadside device position data 9D based on the information acquired from the roadside device 110, and can store the movement history data 9G in the storage 9, which includes the position information of the roadside device 100 as the position information of the smartphone 1 at the time of acquiring information from the roadside device 110.

By executing the control program 9A, the controller 10 can cause the communication unit 6 to transmit the position information of the smartphone 1 to the transmission destination corresponding to the transmission destination information if the position information of the smartphone 1 satisfies the predetermined condition.

The controller 10 includes an arithmetic processing unit. The arithmetic processing unit includes, but not limited to, for example, a CPU, a SoC, an MCU, and an FPGA. The controller 10 integrally controls the operation of the smartphone 1 to realize various functions.

Specifically, the controller 10 executes an instruction included in the program stored in the storage 9 while referring to the data stored in the storage 9 as necessary. And, the controller 10 controls the function unit in accordance with the data and the instruction, thereby realizing various functions. The function unit may include, but not limited to, at least one of the display 2A, the communication unit 6, the receiver 7, and the speaker 11, for example. The controller 10 may change the control in accordance with the detection result of the detection unit. The detection unit may include, but not limited to, for example, at least one of the touch screen 2B, the button 3, the illuminance sensor 4, the proximity sensor 5, the microphone 8, the camera 12, the camera 13, the acceleration sensor 15, the direction sensor 16 and the gyroscope 17.

The controller 10 detects an operation on the smartphone 1. Specifically, the controller 10 cooperates with the touch screen 2B to detect an operation on the touch screen 2B (touch screen display 2).

For example, the controller 10 executes various controls such as changing information displayed on the display 2A according to an operation detected via the touch screen 2B, by executing the control program 9A.

The camera 12 is a front camera that photographs an object facing the front face 1A.
The camera 13 is a rear camera that photographs an object facing the back face 1B.

The connector 14 is a terminal to which another device is connected. The connector 14 may be a general-purpose terminal such as Universal Serial Bus (USB), High-Definition Multimedia Interface (registered trademark) (HDMI), Light Peak (Thunderbolt (registered trademark)), earphone microphone connector. The connector 14 may be a dedicated terminal such as a Dock connector. Devices connected to the connector 14 include, but not limited to, an external storage, a speaker, and a communication device, for example.

Next, with reference to FIG. 7 control method of the smartphone 1 and the action thereof will be described.

Figure 7:
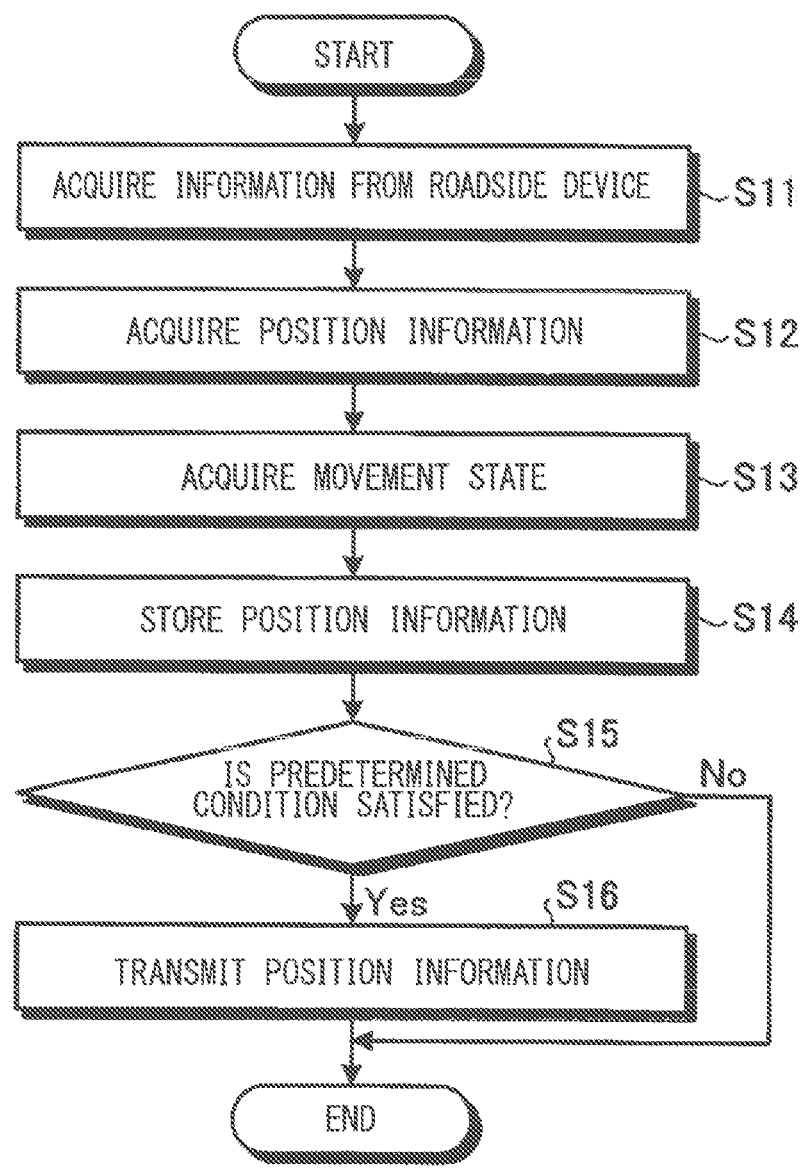
FIG. 7 illustrates a flowchart showing an example of control performed by the smartphone according to an embodiment.

The smartphone 1 can execute the processing procedure shown in FIG. 7 by the controller 10 executing the control program 9A stored in the storage 9. Also, the controller 10 may execute processing procedure of other functions in parallel with the processing procedure shown in FIG. 7.

The controller 10 acquires information from the roadside device 110 (step S11). More specifically, if the distance between the smartphone 1 and the roadside device 110 is equal to or less than a predetermined distance, the controller 10 receives the information that the roadside device 110 wirelessly outputs via the communication unit 6. In other words, if the controller 10 detects the communicable roadside device 110 based on the sensor detection result, the controller 10 receives the information that the roadside device 110 wirelessly transmits. Communicable indicates that a signal capable of transmitting and receiving data arrives. The controller 10 may determine whether or not the distance between the smartphone 1 and the roadside device 110 is equal to or less than a predetermined distance, based on whether or not the received signal strength of the wireless signal output by the roadside device 110 is equal to or greater than a predetermined value, for example. Specifically, the controller 10 determines that the distance between the smartphone 1 and the roadside device 110 is equal to or less than the predetermined distance if the received signal strength of the radio reception wireless signal output from the roadside device 110 is equal to or greater than a predetermined value.

The controller 10 acquires position information (step S12). More specifically, from the roadside device position data 9D, the controller 10 acquires position information corresponding to the identification information of the roadside device 110 included in the acquired information.

The controller 10 acquires the movement state of the user (step S13). More specifically, the controller 10 measures vibration and movement acting on the smartphone 1 based on the direction and magnitude of the acceleration acquired from the acceleration sensor 15. And, the controller 10 refers to the movement state data 9F and determines the movement state from the measurement results of vibration and movement.

The controller 10 stores the position information (step S14). More specifically, the controller 10 stores, as the movement history data 9G, the time when the information is acquired from the roadside device 110, the position information acquired in step S12, and the movement state determined in step S13.

The controller 10 determines whether or not the predetermined condition is satisfied (step S15). More specifically, for example, if the position information acquired in step S12 deviates from the usual action range that is a predetermined range registered in advance, Yes is determined in step S15. Information indicating this action range is included in the setting data 9D.

Alternatively, if the position information indicates to be located on the dangerous road, the controller 10 may determine Yes in step S15. As a dangerous road, for example, a road with a large traffic volume can be adopted. For example, if the information acquired in step S11 includes road information indicating that the traffic volume is high, Yes may be determined in step S15. Whether the traffic volume is high may be determined based on whether the traffic volume included in the road information is equal to or higher than a predetermined amount or whether the road is congested from congestion information included in the road information.

If determining that the predetermined condition is satisfied (Yes in step S15), the controller 10 transmits the position information (step S16). More specifically, the controller 10 transmits the position information of the smartphone 1 (the user carrying the self-device) to the transmission destination indicated by the transmission destination information registered in advance with the mail application 9B or the like. The controller 10 may convert the position information into character information such as an address specified by latitude and longitude based on the map data 9E, character information such as a road name and intersection name, an image of map information indicating a point specified by latitude and longitude based on the map data 9E, or a Uniform Resource Locator (URL) indicating the storage position of the map information, and transmit the converted position information.

If the controller 10 determines that the predetermined condition is not satisfied (No in step S15), the controller 10 ends the process.

The smartphone 1 can implement the function of displaying the movement history by executing the movement history display application 9C stored in the storage 9 by the controller 10.

Figure 8:
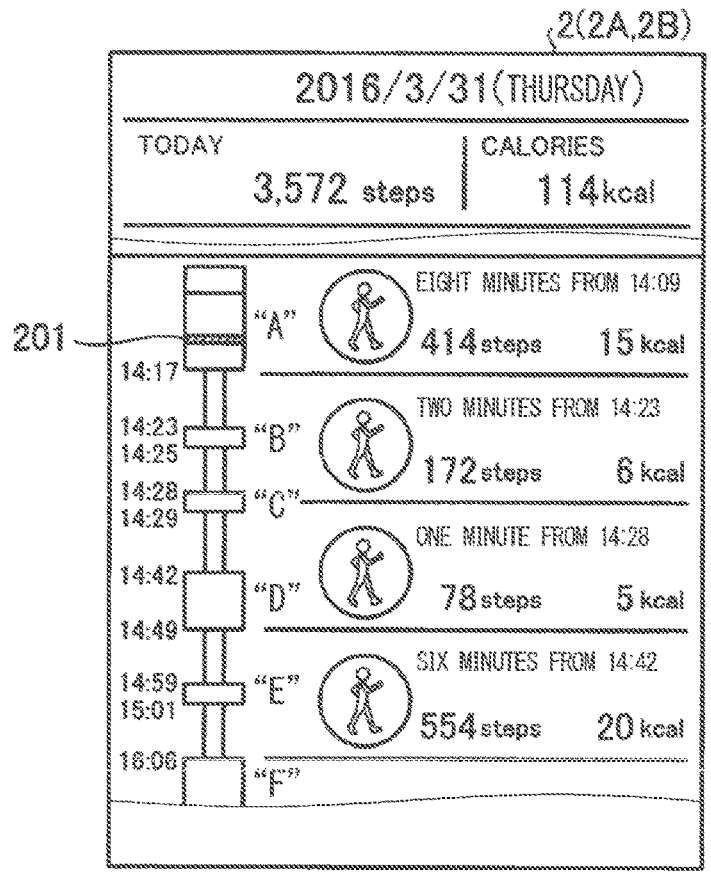
FIG. 8 illustrates a schematic diagram showing an example of display of the smartphone according to an embodiment.

More specifically, upon activation of the movement history display application 9C, the controller 10 can cause the touch screen display 2 to display the position information of the user along with the time and movement state based on the movement history data 9G stored in the storage 9. For example, as shown in FIG. 8, the controller 10 displays the movement history data 9G in chronological order.

As the user moves on the road, the smartphone 1 sequentially communicates with a plurality of roadside devices 110 provided along the road. For example, as the user moves on the road and the user enters a first communicable range of a first roadside device 110 at the time t1, the smartphone 1 acquires an installation position of the first roadside device 110 as the position of the user, as described above. During a period in which the user is within the first communicable range, the smartphone 1 may continue to acquire the installation position of the first roadside device 110 as the position of the user. When the user leaves the first communicable range at the time t [m], the smartphone 1 cannot communicate with the first roadside device 110, so acquisition of the position information of the user based on the first roadside device 110 is not performed. And, as the user further moves on the road and enters a second communicable range of the second roadside device 110 at the time t [m+n], the smartphone 1 acquires an installation position of a second roadside device 110 as the position of the user. During a period in which the user is within the second communicable range, the smartphone 1 may continue to acquire the installation position of the second roadside device 110 as the position of the user. When the user leaves the second communicable range at the time t [m+n+p], the smartphone 1 cannot communicate with the second roadside device 110, so acquisition of the position information of the user based on the second roadside device 110 is not performed.

In this case, in the movement history data 9G, for example, the installation position of the first roadside device 110 is included at each of the times t [l] to t [m], and the installation position of the second roadside device 110 is included at each of the times t [m+n] to t [m+n+p] as the position of the user.

Thereafter, every time the user enters the communicable range of another roadside device 110, the position information of the user is added to the movement history data 9G along with the time.

In an example of FIG. 8, a plurality of times are shown aligned along in the vertical direction on the left side in the screen of the touch screen display 2, and in the right side region of the time region, rectangular blocks having two different types of widths are shown. For example, a wide block indicates a period in which the user is located within the wireless communication range of the roadside device 110, and a narrow block indicates a period in which the user is located outside the wireless communication ranges of all the roadside devices 110. Each time is shown at a position corresponding to each of the upper side and the lower side of a wide block. For example, FIG. 8 shows a wide block in which the time "14:23" and the time "14:25" are appended corresponding to the upper side and the lower side, respectively. The block indicates that the user has entered the communicable range of the roadside device 110 at the time "14:23" and at the time "14:25" that the user has gone out of the communicable range of the roadside device 110. As described above, it can be said that the block of FIG. 8 indicates the position information of the user.

Further, in FIG. 8, the position information of the corresponding roadside device 110 is displayed as "A" to "E", respectively, adjacent to the corresponding wide rectangular blocks. "A "to "E " may be, for example, an address or an intersection name where the roadside devices 110 are located, respectively, and so forth. Also, the denotation "A" to "E" of the position information may be shown inside the corresponding wide rectangular blocks. Alternatively, the controller 10 does not display "A" to "E" in FIG. 8, and if the touch screen 2B detects an operation on the wide block, the position information corresponding to the wide block to which the operation is performed may be displayed.

The controller 10 may cause the position information 201 determined to satisfy the predetermined condition in step S15 to be displayed in a manner different from other position information that is not determined to satisfy the predetermined condition. In FIG. 8, the position information 201 determined to satisfy the predetermined condition is displayed while, for example, changing the color or blinking with other position information not determined to satisfy the predetermined condition.

In this case, the controller 10 stores the information of the determination result as to whether or not the predetermined condition is satisfied in the movement history data 9G and stores thereof in the storage 112. As a specific operation, if the controller 10 receives the information from the roadside device 110, the controller 10 can acquire the position information of the roadside device 110 based on the information, and can determine whether or not the predetermined condition is satisfied based on the information. And, the controller 10 associates the time, the position information, and the determination result with each other in the movement history data 9G, and stores the movement history data 9G in the storage 112. The controller 10 causes the touch screen display 2 to display the position information in a manner according to the determination result included in the movement history data 9G.

Figure 9:
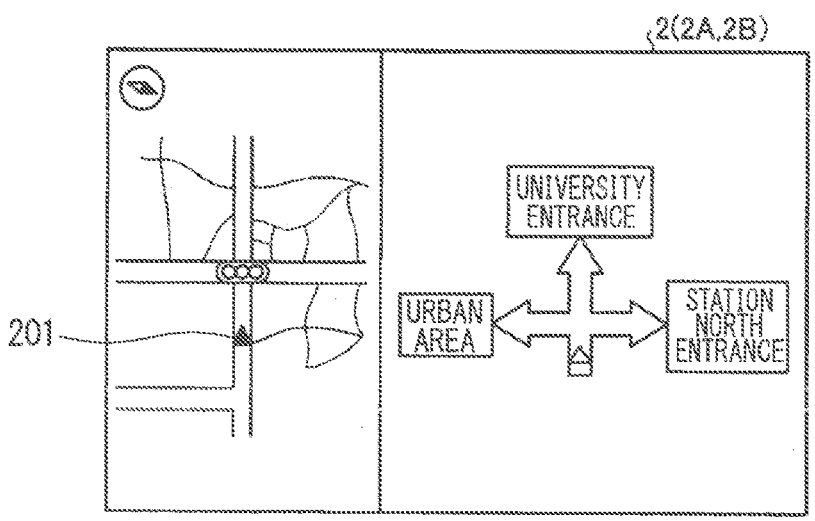
FIG. 9 illustrates a schematic diagram showing an example of display of the smartphone according to an embodiment.

Then, if the controller 10 detects that the user has performed the operation of selecting the position information 201 satisfying the predetermined condition on the touch screen 2B, as shown in FIG. 9, the controller 10 can display the position information 201 satisfying the predetermined condition on the map.

According to above embodiments, the smartphone 1 can acquire the position information of the smartphone 1 at the time of acquiring information from the roadside device 110 based on the information acquired from the roadside device 110. Therefore, the smartphone 1 can suppress the power consumption as compared with the case where the position information is acquired by a signal receiver of a positioning satellite such as a GPS receiver. That is, unlike the embodiments, for example, when the portable electronic device (smartphone 1) frequently acquires the position information by the GPS receiver in order to confirm the position of the self-device, the power consumption of the portable electronic device becomes large. On the other hand, in the embodiments, the position information (predetermined position information) of the roadside device 110 is adopted as the position information of the smartphone 1 based on the information acquired from the roadside device 110. Therefore, the position information of the smartphone 1 is readily acquired and the power consumption is suppressed.

Moreover, a plurality of roadside devices 110 are regularly arranged along roads, intersections, and the like. Therefore, by acquiring the position information of the smartphone 1 based on the information acquired from the roadside device 110, the traveling route of the user moving on the road can be accurately acquired. Therefore, according to the embodiments, the smartphone 1 can acquire the position information of the smartphone 1 with high accuracy as well as the case where the position information is acquired by a signal receiver of a positioning satellite such as a GPS receiver.

Meanwhile, for example, the case where the position information of the smartphone 1 is acquired based on the information received from the public wireless LAN will be described. While many public wireless LANs are installed in urban areas, many places are not installed in residential areas. Therefore, for example, when moving in a residential area, possibilities are that information cannot be received from the public wireless LAN and position information of the smartphone 1 cannot be acquired. Thus, for example, when acquiring the position information of the smartphone 1 based on the information received from the public wireless LAN, possibilities are that the position information of the smartphone 1 may not be acquired depending on the location, depending on the installation condition of the public wireless LAN. However, according to the embodiments, the smartphone 1 acquires the position information of the smartphone 1 based on the information from the roadside device 110 regularly arranged along the road or at an intersection or the like, therefore the position of the smartphone can be acquired more accurately.

The smartphone 1 can acquire the road information of the traveling route along with the identification information from the roadside device 110. Accordingly, based on the road information acquired from the roadside device 110, for example, the smartphone 1 determines a state where the user carrying the self-device is passing through a road with a high traffic volume, a high degree of danger, or staying in the unusual action range, and can transmit the position information to the previously registered destination. As a result, the smartphone 1 determines, for example, that an elderly person or a small child is traveling on a road with a high degree of danger or is staying in the unusual action range, and can notify a parent and so forth. The parent who received the notification can warn the elderly person or the small child as necessary.

The controller 10 of the smartphone 1 can determine that the position information 201 that is determined that the user is passing through a road with a high degree of danger or is staying in the unusual place is displayed in a manner different from the other position information. As a result, the smartphone 1 displays whether the user is not passing through a high-risk road or not passing through the unusual place in an easy-to-see manner.

Embodiments disclosed in the application can be modified without departing from the spirit and scope of the invention. Further, embodiments disclosed in the application and modifications thereof can be appropriately combined. For example, the above embodiments may be modified as follows.

For example, each program shown in FIG. 6 may be divided into a plurality of modules, or may be combined with other programs.

Although a smartphone has been described as an example of a portable electronic device, the device according to the appended claims is not limited to a smartphone. The device according to the appended claims may be a portable electronic device other than a smartphone. Mobile electronic devices include, but not limited to, mobile phones, tablets, portable personal computers, digital cameras, media players, electronic book readers, navigators, and game consoles, for example.

The storage 9 may store the identification information of the roadside device 110 located within the action range as the usual action range of the user. In other words, the identification information of the roadside device 110 existing within the range in which the user usually acts is stored in the storage 9.

If the controller 10 determines that the identification information of the roadside device 110 from which the information is acquired does not coincide with any of the identification information stored in the storage 9, the controller 10 determines that the user has deviated from the usual action range. In this case, the controller 10 transmits the position information and the fact that the user has deviated from the usual action range to the transmission destination stored in the storage 9 by the mail application 9B or the like. In this way, the protector or the supervisor of the destination can watch over the user more reliably. If the user deviates from the usual action range, the smartphone 1 can immediately notify the transmission destination, so that the parent or guardian of the transmission destination or the like can watch the user more reliably.

In an example of FIG. 6, although the smartphone 1 transmits the position information if the predetermined condition is satisfied, the position information may be transmitted regardless of whether or not the predetermined condition is satisfied.

Although the roadside device 110 transmits information including the identification information of the self-device and not including the position information indicated by the latitude and longitude of the self-device, the roadside device 110 may also transmit information including the position information of the self-device. In this case, the smartphone 1 may store, in the storage 9, the position information acquired from the roadside device 110.

Embodiments have been described for clearly disclosing portable electronic devices. However, the portable electronic device should not be limited to the above-described embodiments, and should be configured to embody the configuration in which all modifications and alternatives that can be created by those skilled in the art within the scope of the basic matter described in the specification are applicable.

The invention claimed is:

1. A portable electronic device, comprising:
   a transceiver configured to acquire information from a roadside device;
   a storage;
   a display; and
   at least one processor configured to acquire position information of the roadside device based on the information acquired by the transceiver, and to cause the storage to store the acquired position information of the roadside device as position information indicating a position of the portable electronic device at a time of acquiring the information, wherein the at least one processor is configured to display on the display:
the position information of the portable electronic device; and
time information indicating time at which the portable electronic device is unable to acquire information from any roadside devices.

2. The portable electronic device according to claim 1, wherein
the at least one processor acquires position information indicating an installation position of the roadside device as the position information of the roadside device.

3. The portable electronic device according to claim 1, wherein
the at least one processor is configured to display the position information of the portable electronic device on the display in chronological order.

4. The portable electronic device according to claim 3, wherein
the position information stored in the storage includes a first position and a second position of the portable electronic device,
the first position satisfies a predetermined condition,
the second position does not satisfy the predetermined condition, and
the at least one processor is configured to cause the display to display the first position in a first display manner and to display the second position in a second display manner different from the first display manner.

5. The portable electronic device according to claim 4, wherein
the at least one processor is configured to determine that the predetermined condition is satisfied when the at least one processor determines that the position information of the portable electronic device is out of a predetermined range.

6. The portable electronic device according to claim 4, wherein
the at least one processor is configured to determine that the predetermined condition is satisfied when the at least one processor determines that the position information of the portable electronic device indicates that it is located on a road with a large traffic volume.

7. The portable electronic device according to claim 1, wherein
the at least one processor is configured to cause the display to display a map, and cause the display to display the position information of the portable electronic device on the map.

8. The portable electronic device according to claim 1, wherein the storage is configured to store transmission destination information related to a transmission destination, and wherein
the at least one processor is configured to cause the transceiver to transmit the position information of the portable electronic device to the transmission destination corresponding to the transmission destination information.

9. The portable electronic device according to claim 8, wherein
when the position information of the portable electronic device satisfies a predetermined condition, the at least one processor causes the transceiver to transmit the position information of the portable electronic device satisfying the predetermined condition to the transmission destination corresponding to the transmission destination information.

10. The portable electronic device according to claim 1, wherein
the at least one processor is configured to display on the display the position information of the portable electronic device and the time information in chronological order.

11. A method of controlling a portable electronic device including a storage and a display, the method comprising the steps of:
acquiring information from a roadside device;
acquiring position information of the roadside device based on the acquired information;
causing the storage to store the acquired position information of the roadside device as position information indicating a position of the portable electronic device at a time of acquiring the information; and
causing the display to display the position information of the portable electronic device, and time information indicating time at which the portable electronic device is unable to acquire information from any roadside devices.

12. A non-transitory computer-readable medium storing a control program in a portable electronic device to execute a process of:
receiving information from a roadside device;
determining position information of the roadside device based on the received information; and
causing a storage of the portable electronic device to store the determined position information of the roadside device as position information indicating a position of the portable electronic device at a time of receiving the information, wherein
the position information stored in the storage includes a first position and a second position of the portable electronic device,
the first position satisfies a predetermined condition,
the second position does not satisfy the predetermined condition, and
the control program to further execute a process of causing the display to display the first position in a first display manner and to display the second position in a second display manner different from the first display manner.

13. The non-transitory computer-readable medium according to claim 12, wherein
the control program executes a process of determining that the predetermined condition is satisfied when the at least one processor determines that the position information of the portable electronic device is out of a predetermined range.

14. The non-transitory computer-readable medium according to claim 12, wherein
the control program executes a process of determining that the predetermined condition is satisfied when the at least one processor determines that the position information of the portable electronic device indicates that it is located on a road with a large traffic volume.

* * * * *